United States Patent
Köhler et al.

(10) Patent No.: US 10,654,502 B2
(45) Date of Patent: May 19, 2020

(54) RAIL VEHICLE COMPONENT GROUP AND METHOD FOR GENERATING A LIFE HISTORY OF A MACHINE COMPONENT AND SERVICE METHOD FOR MAINTENANCE

(71) Applicant: SIEMENS AKTIENGESELLSCHAFT, München (DE)

(72) Inventors: Bernd Köhler, Forchheim (DE); Olaf Körner, Nürnberg (DE)

(73) Assignee: Siemens Mobility GmbH, München (DE)

( * ) Notice: Subject to any disclaimer, the term of this patent is extended or adjusted under 35 U.S.C. 154(b) by 0 days.

(21) Appl. No.: 16/068,751

(22) PCT Filed: Dec. 19, 2016

(86) PCT No.: PCT/EP2016/081640
§ 371 (c)(1),
(2) Date: Jul. 9, 2018

(87) PCT Pub. No.: WO2017/121577
PCT Pub. Date: Jul. 20, 2017

(65) Prior Publication Data
US 2019/0023296 A1    Jan. 24, 2019

(30) Foreign Application Priority Data
Jan. 14, 2016   (EP) .................................... 16151303

(51) Int. Cl.
*G06F 15/00* (2006.01)
*B61L 27/00* (2006.01)
(Continued)

(52) U.S. Cl.
CPC .......... *B61L 27/0077* (2013.01); *G06Q 10/20* (2013.01); *G07C 3/08* (2013.01); *G07C 5/085* (2013.01); *G07C 5/008* (2013.01)

(58) Field of Classification Search
None
See application file for complete search history.

(56) References Cited

U.S. PATENT DOCUMENTS

| | | | |
|---|---|---|---|
| 2005/0043870 A1* | 2/2005 | Joshi | B23P 6/002 701/29.5 |
| 2009/0319232 A1* | 12/2009 | Griessler | G01M 13/045 702/184 |

(Continued)

FOREIGN PATENT DOCUMENTS

| | | |
|---|---|---|
| CN | 103345673 A | 10/2013 |
| CN | 104040594 A | 9/2014 |

(Continued)

OTHER PUBLICATIONS

Russian Grant Decision and Search Report for Russian Application No. 2018129353/11(047306). Grant dated Jan. 11, 2019.

(Continued)

*Primary Examiner* — Adam D Tissot
(74) *Attorney, Agent, or Firm* — Lempia Summerfield Katz LLC

(57) ABSTRACT

The disclosure relates to a railway vehicle component group for generating an electronic life history of a machine component. The railway vehicle component group includes a machine component having a storage unit arranged in or on the machine component, and at least one control unit suitable for bidirectional communication with the machine component, wherein operating data is configured to be generated in the control unit. The storage unit is suitable at least for bidirectional communication with the control unit, wherein a storage of the operating data generated via the (Continued)

control unit is provided during the operation of the machine component by at least the bidirectional communication in order to generate an electronic life history of the machine component. The storage unit also has an electronic type label of the machine component. The disclosure also relates to a method for generating a life history of a machine component, as well as a service method for maintenance.

19 Claims, 1 Drawing Sheet

(51) Int. Cl.
    *G07C 3/08*    (2006.01)
    *G06Q 10/00*    (2012.01)
    *G07C 5/08*    (2006.01)
    *G07C 5/00*    (2006.01)

(56) References Cited

U.S. PATENT DOCUMENTS

2012/0053784 A1* 3/2012 Schmidt ................ G01G 19/07
    701/33.4
2017/0129514 A1* 5/2017 Shubs, Jr. ............... B61L 27/04

FOREIGN PATENT DOCUMENTS

| DE | 102008029672 | B3 | 2/2010 | |
|---|---|---|---|---|
| EP | 1508881 | A1 | 2/2005 | |
| EP | 2492849 | A2 | 8/2012 | |
| WO | WO2004013785 | A2 | 2/2004 | |
| WO | WO-2010149303 | A1 * | 12/2010 | ............. G07C 3/08 |
| WO | WO2010149303 | A1 | 12/2010 | |
| WO | WO2013049513 | A1 | 4/2013 | |

OTHER PUBLICATIONS

European Search Report for corresponding Application No. 16151303.1-1953, dated Jul. 11, 2016.
PCT International Search Report and Written Opinion of International Searching Authority dated Mar. 22, 2017 corresponding to PCT International Application No. PCT/EP2016/081640 filed Dec. 19, 2016, with English translation.
Chinese Office Action for Chinese Application No. 201680078998.4 dated Jan. 24, 2019.
European Office Action for European Patent Application No. 16 819 057.7-1009 dated Jul. 26, 2019.

\* cited by examiner

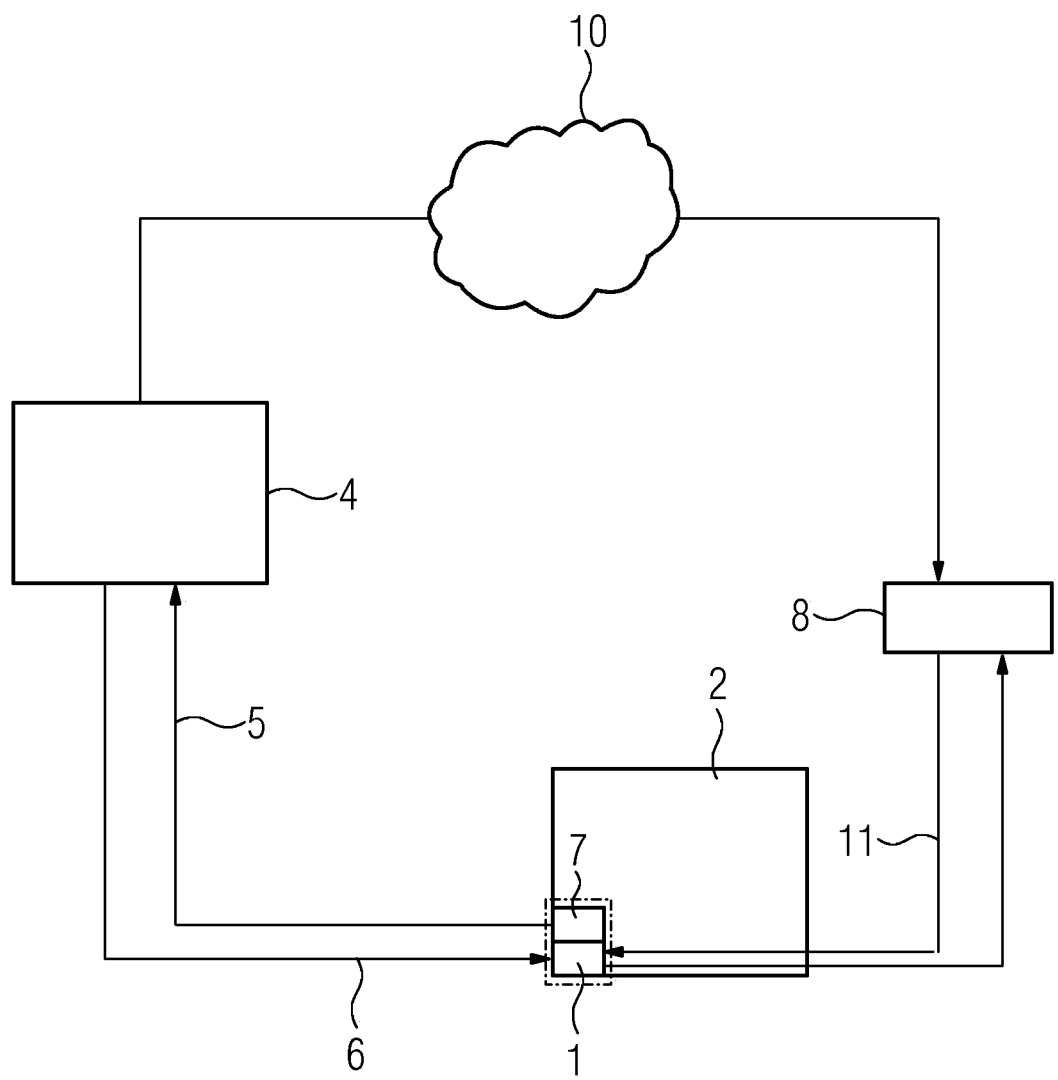

RAIL VEHICLE COMPONENT GROUP AND METHOD FOR GENERATING A LIFE HISTORY OF A MACHINE COMPONENT AND SERVICE METHOD FOR MAINTENANCE

The present patent document is a § 371 nationalization of PCT Application Serial Number PCT/EP2016/081640, filed Dec. 19, 2016, designating the United States, which is hereby incorporated by reference, and this patent document also claims the benefit of European Patent Application No. EP 16151303.1, filed Jan. 14, 2016, which is also hereby incorporated by reference.

TECHNICAL FIELD

The disclosure relates to a rail vehicle component group for generating an electronic life history of a machine component, including a machine component, a storage unit disposed in or on the machine component, at least one control unit which is suitable for bidirectional communication with the machine component, wherein operating data may be generated in the control unit. The disclosure also relates to a method for generating a life history, a machine component, and a service method for maintenance.

BACKGROUND

In the drive system of a train, there is no clear relationship between the available data in the controller of the drive converter and the connected machine components. In particular, a configuration documented at the time of delivery is lost when machine components are replaced in a fleet, e.g., as part of corrective or preventive maintenance.

The configuration of vehicles may not be preserved by the operator/service department at machine component level and is therefore mostly unknown or incorrect.

The converter controller measures and determines much relevant operating data of the connected machine components and may also intelligently correlate, evaluate, store, and collectivize them, etc.

The transmission of operating data to a central database (e.g., cloud) for central evaluation there is often described (Industry 4.0. . . ). However, this requires seamless high-bandwidth connectivity from the field component to the cloud. All parties involved must agree on uniform interfaces, data ownership, etc. These requirements are not always met. In reality, the current situation is rather that the flow of information, (e.g., in the returns process), is based on barely informative handwritten notes attached to the machine component.

Although data (e.g., load spectra) is available in the higher-level controller (e.g., in the converter in respect of the connected motor, gearbox, for example), as there is no clear relationship (association) between converter and motor, only load data averaged over a fleet of vehicles and a comparatively long period of time may be evaluated. Therefore, only an average machine component loading may be determined. Also, no individual data is available for damage assessment. Configuration management, (e.g., which machine component is used in which vehicle and over which period of time), is conducted manually in production and/or maintenance, if required.

SUMMARY AND DESCRIPTION

The scope of the present disclosure is defined solely by the appended claims and is not affected to any degree by the statements within this summary. The present embodiments may obviate one or more of the drawbacks or limitations in the related art.

The first and second object of the present disclosure is therefore to specify a rail vehicle component group and a method whereby such manually conducted configuration management may be eliminated. Another (e.g., third) object is to specify a service method for maintenance of such a rail vehicle component group.

The first object is achieved by specifying a rail vehicle component group for generating an electronic life history of a machine component, including a machine component having a storage unit, wherein the storage unit is disposed in or on the machine component. The rail vehicle component group also includes at least one control unit which is suitable for bidirectional communication with the machine component. Operating data may be generated in the control unit. The storage unit is at least suitable for bidirectional communication with the control unit. During operation of the machine component, storage of the operating data generated by the control unit is provided by at least the bidirectional communication in order to generate an electronic life history of the machine component. Electronic life history actions are to be understood as meaning at least the chronological sequence of all data/operating data. The storage unit also has an electronic nameplate of the machine component. By the bidirectional communication of the control unit and the storage unit, the storage unit may therefore transmit the machine component's identification data from the electronic nameplate of the machine component to the control unit when the control unit is commissioned, so that the data is subject to clear assignment.

The second object is achieved by specifying a method for generating an electronic life history of a machine component for a rail vehicle component group, having a storage unit which is disposed in or on the machine component. A control unit is additionally provided which is suitable for bidirectional communication with the machine component. In the control unit, operating data is generated which is transmitted to the machine component by the bidirectional communication. The storage unit is suitable at least for bidirectional communication with the control unit. To generate an electronic life history of the machine component, storage of the operating data generated by the control unit is performed by the bidirectional communication during operation of the machine component. The machine component is uniquely identified by an electronic nameplate in the storage unit.

The third object is achieved by specifying a service method for such a rail vehicle component group, including the following acts: removing the machine component from the rail vehicle component group and if necessary removing the storage unit; reading the storage unit; installing the serviced machine components with the storage unit or a new storage unit_new, wherein the new storage unit_new is loaded at least with the electronic nameplate and the read electronic life history; or installing a new machine component_new with the storage unit or a new storage unit_new, wherein the storage unit or the storage unit_new is loaded at least with the electronic nameplate of the machine component_new.

The digital storage unit therefore holds identification data of the machine components, which it transmits to the controller, thereby allowing the current system configuration to be read at any time. Over the lifetime of the component, the digital storage unit also stores the operating data which the controller has determined for the machine component and returns it to the manufacturer with the machine component for servicing purposes.

This data is available on a component by component basis as life history actions of the component for maintenance, configuration management, engineering, further development, damage assessment, etc. As a customer benefit, this results in increased service management efficiency or improved price management.

The electronic nameplate on the machine component also enables the configuration of the vehicle to be read at any time. Manual maintenance of vehicle configuration lists in central databases is unnecessary.

It is possible to utilize the intelligence already available in the controller for individual data acquisition of particular machine components operated from the controller. That is to say, the machine component itself remains dumb in terms of intelligent evaluation of its operating data, as the intelligence is in the connected controller by which it is operated. In contrast to the "cloud solution", the data is not sent "up" to the cloud but "down" to the component where it is stored in the storage unit. This obviates the need for broadband connectivity of the component to a central data server, e.g., an infrastructure for a cloud is no longer necessary. It is therefore unnecessary for the interfaces to be standardized, e.g., a manufacturer-specific data format may be selected. It also obviates the need to harmonize the interests of all parties involved, e.g., of manufacturer, service department, operator, as the manufacturer gets the data back with the "material flow of the component" and via a data flow to be installed in parallel in a cloud.

Generating the life history of the component allows better damage assessment, better load data for design, etc.

The disclosure also provides that if the storage unit is replaced, for example, the storage unit receives the component identity by initialization.

Individual data may be used in the controller for better control, e.g., by AutoIBN, protection by threshold values and higher utilization. A competitive advantage is also obtained due to better knowledge of real field loading for future design, better damage assessment by the electronic actions on the defective component, etc.

The disclosure now provides a clear relationship between the data and the component, particularly when components in a fleet are interchanged as part of corrective and preventive maintenance. Also, the configuration of complex systems having many machine components is known for each individual component.

In an embodiment, the machine component has at least one sensor for generating sensor data. This may be acquired in the control unit by bidirectional communication during operation of the machine component, wherein the operating data may be at least partially generated in the control unit using the acquired sensor data. The storage unit may be provided, (e.g., incorporated), in a sensor. A per se simple sensor (e.g., temperature) is augmented by additional storage for the purpose of data keeping for the component on which it is mounted (e.g., motor, gearbox). That is to say, in addition to the sensor function, the sensor is used as a data medium.

A connection between a "sensor with storage unit" and a control unit is used not only for transmitting measured values, but also for transmitting data to and from the incorporated storage unit. The bidirectional communication link between sensor and control unit is advantageously used here; there is therefore no need for another bidirectional communication link.

The "sensor with storage unit" therefore contains at least the identification data provided by the electronic nameplate. In the course of time, the "sensor with storage unit" is filled with the data of the life history actions (e.g., load data, service data, failure data, etc.) of the machine component on which it is mounted by the higher-level intelligent controller.

Operation without initialization of a replacement sensor may thus be prevented (e.g., clock inhibition, converter). The operation of unidentified components on a control unit may therefore be blocked.

The electronic nameplate may be loaded into the storage unit prior to commissioning or at commissioning via the control unit.

The operating data may also be compressed in the control unit prior to transmission to the storage unit. This may result in improved, faster transmission, and reduced storage requirement.

To generate the electronic life history of the machine component, the control unit may transmit only the current operating data which it compares with previous operating data. Only if the operating data is changed compared to the previous operating data is this changed operating data transmitted to the storage unit to generate the electronic life history.

The storage unit may also have at least one first and one second storage area, wherein the electronic nameplate, (e.g., identity-related data), is stored in the first storage area and the generated life history is stored in the second storage area.

The electronic life history may also be read at the end of life of the machine component, e.g., in the factory in the case of return or repair of the machine component. Alternatively, or additionally, however, it may also be read for maintenance purposes during operation of the machine component.

The electronic nameplate may include at least identification data for uniquely identifying the machine component.

A central data server, (e.g., a cloud), may be provided for storage and/or further processing of the operating data generated by the control unit. Further processing of the data may also be provided in the cloud. Data of other machine components running in parallel may also be advantageously provided in the cloud.

The storage unit may also have a digital interface for transmitting at least the operating data to a mobile terminal. The complete life history and the nameplate may also be transmitted. This enables maintenance to be simplified.

The operating data may be transmitted from the control unit to the storage unit in a timed manner during operation. This enables energy/power to be saved.

In a particular embodiment, the operating data may be stored on the storage unit in a non-overwritable and non-modifiable manner. This prevents manipulation of the data (e.g., after removal).

In an embodiment, the control unit is a power converter.

The operating data may be stored in chronological order to generate the electronic life history. The time line of the states of the machine components may therefore be comprehended at any point in time.

BRIEF DESCRIPTION OF THE DRAWINGS

Further features, characteristics, and advantages of the present disclosure will emerge from the follow description which proceeds with reference to the accompanying schematic drawings in which:

FIG. 1 depicts an example of a storage unit during operation.

DETAILED DESCRIPTION

Although the disclosure has been illustrated and described in detail by the exemplary embodiments, the disclosure is not limited to the examples disclosed. Variations thereof will be apparent to persons skilled in the art without departing from the scope of protection sought for the disclosure as defined by the subsequent claims.

The configuration of systems is documented by the manufacturer in the as-delivered condition (e.g., also for traceability). Over the period of use of the systems, frequent modifications/re-configurations take place. Beginning with commissioning, over many maintenance cycles and repairs, system configuration knowledge is gradually lost. There is no clear relationship between the data and the machine component, particularly if the machine components, e.g., in a fleet are interchanged as part of corrective and preventive maintenance. Also, the configuration of vehicles with the individual machine components may not be known. The changes are not fed back to the database originally created during production. There are also no standardized interfaces and tools and no consistent common interest of manufacturers, service department, and operators.

This is now prevented. FIG. 1 depicts a rail vehicle component group during operation. For this purpose, a machine component 2 is provided which has at least one storage unit 1 and at least one sensor 7. A control unit 4, (e.g., a converter), is also provided. During operation, the machine component 2 transmits sensor data 5 generated by at least one sensor 7 to the converter. From this sensor data 5, the converter generates the control data, the so-called operating data 6. A storage unit 1 is now mounted in the machine component 2 in a component-fixed manner, e.g., incorporated in the component. The storage unit 1 may be mounted in the sensor 7 disposed in or on the machine component 2. This additional storage unit 1 is used solely for data storage locally, e.g., on the machine component 2 itself. The storage unit 1 stores the operating data 6, which is transmitted by the converter by bidirectional communication. Here, the connection from the sensor 7 to the converter may be used, as it is already present anyway. Storing the operating data 6 in the storage unit 1 makes it possible to generate an electronic life history of the machine component 2. That is to say, all the data is combined chronologically to create a life history. This will be explained in greater detail below. Storage of the electronic nameplate 11, e.g., at least the identification data of the machine component 2, is additionally provided. By the bidirectional communication, at least this identification data of the machine component 2 is transmitted to the converter.

The electronic nameplate 11 contains the identification data, e.g., an at least unique serial number of the machine component (e.g., motor, gearbox, . . . ). In addition, the motor data (e.g., rotor flux linkage of PM machines), configuration data (e.g., year of manufacture, characteristic current and/or power values, batch number, etc.) may be provided.

By the electronic nameplate 11 on each machine component 2, the configuration of the machine component 2 may be read at any time. Manual maintenance of configuration lists in a central database is unnecessary. The sensor 7 may also communicate the identification data of the machine component 2 to the converter at any time, and thus allows the current system configuration to be read at any time.

If the sensor of the prior art has to be replaced during maintenance (e.g., corrective or preventive), the replacement part will not have stored the machine component data. This is the case, for example, if the machine component 2 (e.g., motor) and the storage unit or rather the sensor with storage unit have never been connected to the controller, e.g., to the converter. Before being mounted on the machine component 2, the neutral "replacement sensor with new storage unit" is therefore provided with the identification data thereof (e.g., unique serial number). The data required for this purpose may come, e.g., from a central database, a so-called cloud 10, or from the old sensor's machine-readable electronic nameplate 11 which has been acquired using a mobile terminal and is now programmed into the storage unit.

In another case, the machine component 2 is actually already connected to the controller, e.g., the converter, and only the "sensor 7 with new storage unit_new" is replaced. Here too, the neutral "replacement sensor with storage unit_new" is initialized with the identification data (e.g., unique serial number, etc.) by automatically reloading the missing data of the machine component 2 into the storage unit_new of the new sensor 7 after installation, (e.g., in the vehicle), and connection to the converter. The hitherto generated life history of the machine component 2 is also loaded onto the storage unit_new. This makes it possible to create an electronic life history over the service life of such a machine component 2.

In other words, the sensor 7 which is disposed in the machine component 2 and incorporates the storage unit 1 has an electronically readable nameplate 11 containing machine component data (e.g., RFID, barcode, . . . ) and which carries at least the unique serial number. This data is then read using a handset/mobile terminal. The data readout is transmitted completely or partially to the new storage unit_new having an augmented sensor of this kind.

Operation without initialization of such a replacement sensor may be prevented (e.g., clock inhibition, converter). Operation of unidentified machine components on a controller may be blocked.

The digital storage unit 1 holds and transmits identification data of the machine component 2 to the converter and therefore allows the current system configuration to be read at any time.

In addition, the operating data 6 is stored in the storage unit 1 in a time-structured manner. Storing of the operating data 6 in the storage unit 1 enables an electronic life history of the machine component 2 to be generated. This operating data 6 may contain data such as load spectra (e.g., power, speed, torque, temperatures, damage notifications, maintenance intervals, . . . ), mileage, and maintenance data. Such a life history may also be termed a machine history. Self-evidently, other data is also possible. This operating data 6 is available component by component as life history actions of the machine component 2 for maintenance, configuration management, engineering, further development, damage assessment, etc.

The operating data 6 which the controller has determined for the machine component 2 and which is returned along with the machine component 2 to the manufacturer, (e.g., to the factory 8), for servicing purposes in the form of an electronic life history is therefore stored in the storage unit 1 over the lifetime of the machine component 2.

This prevents the situation whereby there is no clear relationship between operating data 6 and the machine component 2, particularly when the machine components 2 are interchanged in a fleet as part of corrective and preventive maintenance. The sensor 7 may be a temperature sensor, a motor speed sensor, or a vibration sensor.

In other words, the operating data 6 is stored in the storage unit 1 in the sensor 7 permanently fixed to the component, (e.g., the machine component 2 carries the operating data 6 with it). It may also be additionally stored in a central database 10, (e.g., a cloud), where analyses and calculations may also be performed before it is retrieved, for example, by the factory 8, e.g., for servicing.

However, in contrast to a purely "cloud solution", the operating data 6 is not only sent "up" to the cloud, but also "down" to the machine component 2 where it is stored in the storage unit 1. This obviates the need for broadband connectivity of the machine component 2 to a central data server (e.g., no infrastructure for cloud). In addition, the interfaces do not need to be standardized. A manufacturer-specific data format may be selected and it is not necessary to harmonize the interests of all parties involved, e.g. the manufacturer, the service department, the operator, as the operating data 6 is returned to the manufacturer with the "material flow of the machine component 2" and not only via a data flow of the cloud 10 installed in parallel.

The machine component 2 may therefore be used in the returns process as the carrier of its own data, thus enabling it then to be evaluated centrally, e.g., in the factory 8. Consequently, it is provided that at least the identity of the machine component 2 is reliably transferred to a new sensor when a defective storage unit 1 or rather sensor 7 with storage unit 1 is replaced during maintenance.

The disclosure makes use of the intelligence already present in the controller for individual data acquisition of particular machine components operated on the controller. That is to say, the machine component 2 itself remains "dumb" in respect of intelligent evaluation of its operating data 6, as the intelligence resides in the control unit 4 with which it is operated.

Generation of the life history actions of the machine component 2 allows better damage assessment and better load data for design purposes. It is also provided that a replacement sensor gets the machine component identity by initialization.

Individual data may be used in the controller for better control (e.g., AutoIBN), protection (e.g., threshold values) and higher utilization.

For simple implementation and also retrofitting, a per se simple sensor (e.g., temperature) may be augmented by an additional storage device for the purpose of data holding for the machine component on which it is mounted (e.g., motor, gearbox). That is to say, in addition to the sensor function, the storage unit 1 is used exclusively as a data medium and for generating an electronic life history. For this purpose, the storage unit 1 is filled in the course of time with the data of the life history actions (e.g., load data, service data, failure data, etc.) of the machine component 2 on which it is mounted by the higher-level intelligent controller. The storage unit 1 also contains identification in the form of an electronic nameplate 11.

The communication between the sensor 7 with the storage unit 1 and the converter is advantageously used not only for measured value transmission, but also for transmitting operating data 6 to and from the integral storage device.

In addition, the operating data 6 is advantageously stored in a non-erasable or non-modifiable manner in the storage unit. This provides protection from external tampering, e.g., in the factory 8. Compression of the operating data 6 may also be performed prior to transmission of the operating data 6 to the storage unit 1. The operating data 6 may be stored e.g. in its chronological sequence. Also, only the varying operating data 6 may be transmitted to the storage unit 1 for storage and generation of an electronic life history. The disclosure provides better knowledge of the real loading in the field for future design, better damage assessment by an electronic life history on the defective machine component and, as a result, an increased competitive advantage for the customer.

Although the disclosure has been illustrated and described in detail by the exemplary embodiments, the disclosure is not restricted by the disclosed examples and the person skilled in the art may derive other variations from this without departing from the scope of protection of the disclosure. It is therefore intended that the foregoing description be regarded as illustrative rather than limiting, and that it be understood that all equivalents and/or combinations of embodiments are intended to be included in this description.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. A rail vehicle component group for generating an electronic life history of a machine component, the rail vehicle component group comprising:
   a machine component having a storage unit and a sensor,
      wherein the storage unit is incorporated in the sensor and the sensor is mounted on the machine component, and wherein the storage unit has an electronic nameplate of the machine component; and
   at least one control unit configured for bidirectional communication with the machine component,
   wherein the sensor of the machine component is configured to generate sensor data,
   wherein the control unit is configured to acquire the sensor data by the bidirectional communication with the machine component during operation of the machine component,
   wherein the control unit is exclusively configured to generate operating data using the acquired sensor data,
   wherein the control unit is exclusively configured to evaluate the operating data of the machine component,
   wherein the storage unit of the machine component is configured for at least for bidirectional communication with the control unit, and
   wherein, during operation of the machine component, storage of the operating data generated and evaluated by the control unit is provided by at least the bidirectional communication to generate an electronic life history of the machine component.

2. The rail vehicle component group of claim 1, wherein a connection between the sensor and the storage unit is used for measured value transmission and for transmission of data to and from the incorporated storage unit.

3. The rail vehicle component group of claim 1, wherein the electronic life history comprises load data, service data, failure data, or a combination thereof of the machine component.

4. The rail vehicle component group of claim 2, wherein the connection between the sensor and the storage unit is configured to be used for bidirectional communication.

5. The rail vehicle component group of claim 4, wherein the electronic nameplate is configured to be loaded into the storage unit during or prior to commissioning of the sensor.

6. The rail vehicle component group of claim 1, wherein the electronic nameplate is configured to be loaded into the storage unit prior to or during commissioning.

7. The rail vehicle component group of claim 1, wherein the operating data is compressed in the control unit prior to transmission to the storage unit.

8. The rail vehicle component group of claim 1, wherein, to generate the electronic life history of the machine component, the control unit only compares the current operating data with previous operating data, and
wherein the control unit is configured to, only when the current operating data has changed compared to the previous operating data, transmit the changed operating data to the storage unit to generate the electronic life history.

9. The rail vehicle component group of claim 1, wherein the storage unit comprises a first storage area and a second storage area, wherein the electronic nameplate is stored in the first storage area and the generated life history is stored in the second storage area.

10. The rail vehicle component group of claim 1, wherein the electronic life history is configured to be retrieved at the end of a useful life of machine component, during maintenance of the machine component, or a combination thereof.

11. The rail vehicle component group of claim 1, wherein the electronic nameplate comprises identification data for uniquely identifying the machine component.

12. The rail vehicle component group of claim 1, further comprising:
a central data server for storage, processing, or both storage and processing of the operating data generated by the control unit.

13. The rail vehicle component group of claim 1, wherein the storage unit comprises a digital interface for transmitting at least the operating data to a mobile terminal.

14. The rail vehicle component group of claim 1, wherein transmission of the operating data from the control unit to the storage unit takes place during the operation of machine component.

15. The rail vehicle component group of claim 1, wherein the operating data is stored in a non-overwritable and non-modifiable manner on the storage unit.

16. The rail vehicle component group of claim 1, wherein the operating data for generating the electronic life history is stored in a chronological sequence.

17. A method for generating an electronic life history of a machine component for a rail vehicle component group having a sensor mounted on the machine component, wherein a storage unit is incorporated in the sensor, and a control unit configured for bidirectional communication with the machine component, the method comprising:
generating sensor data by the sensor mounted on the machine component;
acquiring the sensor data by the control unit through bidirectional communication during operation of the machine component;
generating operating data exclusively by the control unit using the acquired sensor data;
evaluating the operating data exclusively by the control unit;
storing the operating data in the storage unit through bidirectional communication with the control unit during the operation of the machine component; and
uniquely identifying the machine component by an electronic nameplate in the storage unit.

18. The method of claim 17, further comprising:
generating the electronic life history of the machine component of the rail vehicle component group.

19. The rail vehicle component group of claim 12, wherein the central data server is a cloud server.

* * * * *